United States Statutory Invention Registration [19]

[11] Reg. Number: H631

Hamad et al. [43] Published: May 2, 1989

[54] APPARATUS FOR FORMING A METAL SHEATH AROUND A CABLE CORE

[76] Inventors: Mamdouh S. Hamad, 20211 Lake Sherwood Dr., Katy, Tex. 77450; Daniel G. Pikula, 4843 Colonel Perry Dr., Columbus, Ohio 43229

[21] Appl. No.: 80,365

[22] Filed: Jul. 30, 1987

Related U.S. Application Data

[63] Continuation-in-part of Ser. No. 9,858, Feb. 2, 1987, abandoned.

[51] Int. Cl.[4] ..... B23P 19/04

[52] U.S. Cl. ..... 29/745; 29/430; 29/728; 29/564.1; 72/52; 72/182

[58] Field of Search ..... 29/745, 728, 564.1, 29/33 E, 33 F, 33.5, 828; 72/52, 178, 181, 182

[56] References Cited

U.S. PATENT DOCUMENTS

| | | | |
|---|---|---|---|
| 2,064,453 | 12/1936 | Wheeler | 72/246 |
| 2,156,952 | 5/1939 | Morsing | 29/728 |
| 2,563,214 | 8/1951 | Croson | 72/181 |

*Primary Examiner*—Deborah L. Kyle
*Assistant Examiner*—Michael J. Carone
*Attorney, Agent, or Firm*—Thomas D. Zindrick; Bruce M. Kanuch; Richard G. Waterman

[57] ABSTRACT

An apparatus for forming a cable. The cable generally comprises a core sheathed with a metal tape. A plastic jacket, e.g., polyethylene, is extruded over the sheath. The apparatus includes a self-tracking edge forming apparatus which bends the longitudinal edges of the tape. When the tape is overlapped over the core, the bent edges provide intimate control in the overlap area to promote proper sealing to eliminate failure of the cable jacket through a "zippering" effect. The edge forming apparatus may comprise a movable and a fixed forming roller, one of the forming rollers having a surface with flanged ends and the other surface having a surface that facially conforms to the curvatures of the flanged roller, and adjusting means to move the first roller relative to the second roller. The edge forming apparatus is self-tracking because it is mounted on a base comprising apparatus to movably adjust the edge forming apparatus in relation to lateral movement of the metal tape as it is pulled along the tape path.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR FORMING A METAL SHEATH AROUND A CABLE CORE

This application is a continuation-in-part of copending application Ser. No. 009,858 filed Feb. 2, 1987 now abandoned.

BACKGROUND OF THE INVENTION

During the manufacture of certain constructions of communications cable, a core comprising a plurality of electrically insulated conductors is enclosed within a metal sheath. The sheath may be made of copper, copper clad or stainless steel, steel, aluminum and low tensile copper. When constructed of high tensile copper, copper clad or stainless steel, steel, zinc-coated steel, terne plate or other clad metal, the sheath serves a dual function of shielding and armoring the cable core. Shielding protects the cable core from lightning damage and from electrical disturbances when installed in the field. By "armoring" is meant that the sheath is designed to provide strength when the cable is subjected to crushing loads, for instance when buried, or as protection against being cut in two by things such as rocks or rodents. When the sheath is constructed of aluminum or low tensile copper, it serves only to shield the cable core. The sheath may be constructed of dual sheathed systems of aluminum and steel, in which case the steel sheath particularly is the outer of the two.

Conventionally, the sheath is formed from a continuous tape, which is often corrugated and which is wrapped longitudinally about the cable core. The longitudinal edge portions of the corrugated sheath intermesh to form an overlap seam longitudinally along the core. It is sometimes required to join the overlapped edge portions together, for instance by soldering or bonding, so as to increase protection to the core.

The step of soldering, bonding or otherwise mechanically joining the steel sheath is usually one of the most expensive steps in the entire cable manufacturing operation. For example, when the seam of the steel sheath is to be soldered, it is normally necessary to provide one or more layers or coatings of conductive metal on its surface to permit reasonable soldering rates, thus adding considerably to the cost of manufacturing. Further, because of limitations on soldering rates, even when the conductive coatings are utilized, the cable manufacturing process normally cannot be carried out as a continuous in-line operation. In the forming of the cable core, the soldering of the steel sheath and the application of a final outer plastic jacket must be accomplished in separate steps. Additional expense is involved by the necessity of providing a heat barrier in the cable to protect the cable core during the soldering operation, and the cost of solder wire to form the soldered seam.

With the advent of a waterproofing system for communications cable of the type shown, for example in U.S. Pat. No. 3,607,487, issued to M. C. Biskeborn et al. on Sept. 21, 1971, it is no longer necessary for the sheath seam to be joined to form the hermetic seal as long as longitudinal edge portions of the metallic sheath are overlapped and a closed seam produced by suitable forming or working of the metal tape.

In manufacturing such a cable with an unjoined seam, it has been found that unless the overlapped seam is formed properly, the cable jacket will fail. Specifically, it was found that an outer overlapping edge portion of the metallic sheath tends to rebound subsequent to its forming and protrude into the plastic jacket that was extruded around it. Thus, the edge portions of the sheath tend to create a pinched cable which has a distorted periphery, or notch, which is not substantially circular in configuration. Under the sidewall pressures exerted on the sheath by the cable installation process, the edge of the overlap can cause the jacket to be cut and peel off the cable in a process known as "zippering".

It would thus be advantageous if there were an apparatus for forming the edges of the metal sheath such that if it were to rebound subsequent to forming, the integrity of the thermoplastic jacket would not be compromised.

The foregoing problems of the prior art which deal with the forming of communications cable are overcome by the method and apparatus of this invention, in which the edges of the tape are preformed to allow the overlap to be intimately formed when the sheath is made, thus improving sealing.

SUMMARY OF THE INVENTION

The present invention is an apparatus for forming a sheath about a cable core comprising: means for longitudinally advancing the cable core along a feed path and for coordinately advancing the metal tape with the cable core; edge bending means comprising a support having a support surface for a first face of a generally metal tape and pressure applying means to apply pressure to the second face of the generally planar metal tape to deform longitudinal edge portions of the tape to a generally smooth curved configuration relative to lateral adjacent tape portions and towards the tape face that will be in faying relationship with the cable core, said edge portions being curved sufficiently to preclude the outer edge portions of the sheath from protruding into the polyethylene jacket; and means for engaging and forming the metal tape into a tubular sheath with the bent edge portions overlapped.

DETAILED DESCRIPTION

Figure 1:
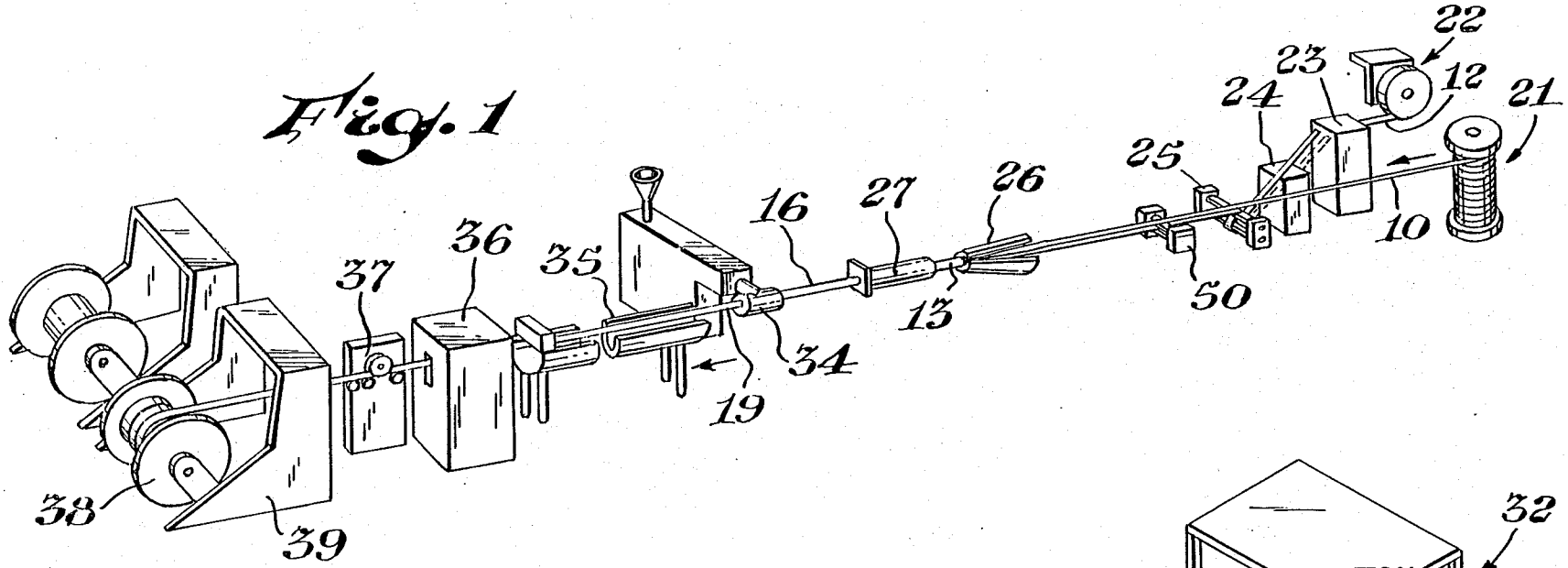
FIG. 1 is a perspective view of a manufacturing line for forming a metal sheath, and jacket about a cable core.

Referring to FIGS. 1, cable core 10, and metal tape 12 are advanced from right to left.

By the term "cable" is meant to include any electrical conductor such as wires, or any optical fibers for communication, control, instrument, or power applications. Electrical conductors are used for telecommunications or power in aerial, buried submarine or underground applications at various voltages and frequencies. Optical fibers are used for telecommunications or sensing at various wavelengths.

Construction of cables is generally well known in the art. The invention will be more readily understood by reference to the accompanying drawings, which illustrate some of the various conductors and cables whose construction is improved in accordance with this invention.

Metal tape 12 may be any low or high tensile metal. Exemplary metals include steel, copper clad or stainless steel, high tensile copper, low tensile copper and aluminum. Metal tape 12 may be bare; or plastic-clad, e.g., coated with an ethylene-acrylic acid (EAA) copolmer. Further, metal tape 12 may be corrugated or uncorrugated.

A reel 21 of cable core 10 formed from one or more cable units 11 (shown in FIG. 9) has the unit or units payed off therefrom. In the following description, a single unit will be referred to, but it is to be understood that this may mean a single unit or a plurality of units which form the cable core, depending on the cable size.

The metal tape 12 is advanced from a payoff stand 22, to a tape coating apparatus, or oiler, 23 which lightly coats the tape with a mineral-based oil to reduce friction and wear through subsequent forming apparatus.

From the oiler, the metal tape may, optionally, be passed through a corrugater 24, which is downstream from the oiler 23. The corrugater 24 provides corrugated metal tape (shown by broken lines in FIG. 1) having corrugations of the necessary width and depth. Unless specifically stated otherwise, it is to be understood that any reference to metal tape 12 will mean that it may be either corrugated or uncorrugated.

The metal tape then travels through a set of guide rollers 25 which can be adjusted vertically and laterally to facilitate proper tape alignment through subsequent forming apparatus. The tape is then passed through an edge former 50 in accordance with this invention, which will be discussed in greater detail below.

The cable core 10 and metal tape 12 are each advanced into a tray/shoe former 26, the details of which are known in the art. The tray/shoe former 26 has an internal tube, which forces the tape to assume the curvature of the former. The metal tape 12 is formed into a cylindrical metal sheath 13 around the cable core 10, having the desired overlap seam 13(o) (shown in FIG. 9). Sheathed unit 16 is formed with the edge of the sheath being overlapped about the cable core 10.

The cylindrical sheath 13 is then passed through a series of three sizing dies which have been placed inside a stationary metal tube 27. The sizing dies form the sheath 13 into a desired size.

Figure 2:
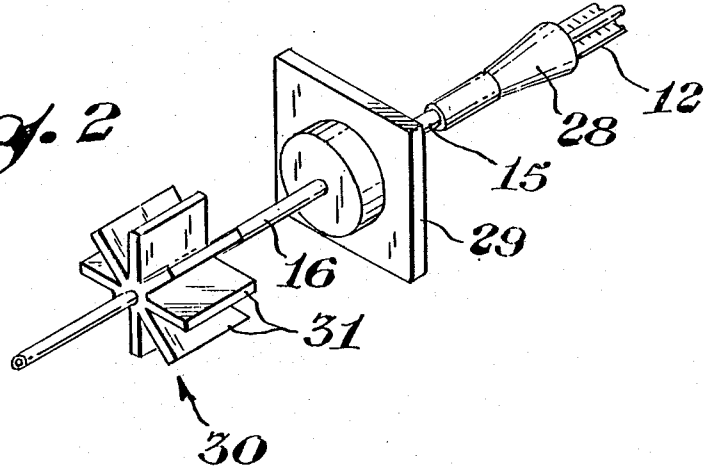
FIG. 2 is a fragmentary perspective view of an alternate embodiment of a forming die, which is only used for corrugated metal sheaths.

FIG. 2 shows other embodiments of forming and sizing dies, which are only used when metal tape 12 is corrugated. The cable core 10 and corrugated metal tape 12 are each passed through a cone former 28 where the corrugated metal tape 12 is partially longitudinally formed around the core in a substantial U-shaped configuration to form a partially sheathed unit 15. The cone former 28 is described only briefly because cone formers are generally well known in the art. While a cone former has been shown in the instant illustration, it should be understood that formers of various types may be utilized such as belt formers of the type shown in U.S. Pat. No. 3,785,048, issued to W. E. Petersen on Jan. 15, 1974.

The partially sheathed unit 15 may be passed through an overlapping and forming die, designated generally by the numeral 29. The overlapping die 29 forms the corrugated metal tape 12 into metal sheath 13 around the cable core, creating an overlapping seam 13(o)(-shown in FIG. 9). Sheathed unit 16 is formed with the corrugated edges of the sheath being intermeshed about the cable core 10.

Sheathed unit 16 is then passed through a finger sizing die 30 which further forms the sheathed unit 16 by shaping the metal sheath 13 to the proper size about the cable core and reduces the overlap springback of the corrugated metal tape 12. Reduced springback of the corrugated metal tape 12 is particularly important before it enters downstream into a cross-head extruder 34. The finger sizing die 30 may consist of a plurality of upper depending fingers 31 which force the shielded unit against a semi-circular die.

Figure 3:
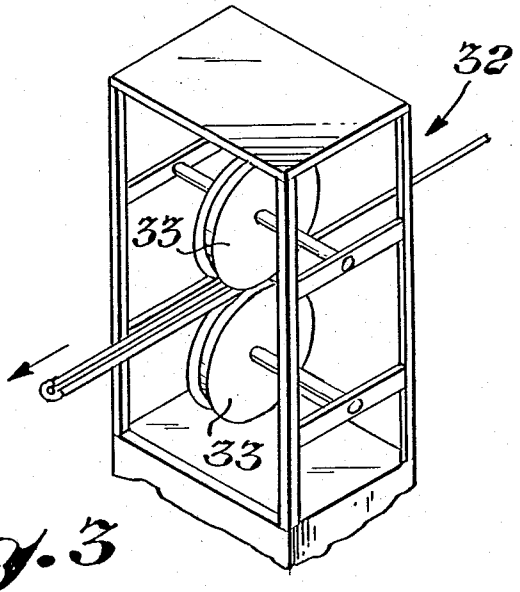
FIG. 3 is a fragmentary perspective view of an alternate embodiment of a sizing die.

As shown in FIG. 3, a roller sizing die 32 may alternatively be used in place of the finger sizing die 30. The roller sizing die consists of a plurality of rollers 33 spaced in a proper position about a sheathed unit. Both sizing die embodiments, 30 and 32, are known in the art.

After being formed and sized by either the tray/shoe former 27 or the overlapping and sizing die 29, the sheathed unit 16 is then advanced through the cross-head extruder 34, which is well known in the art. A plastic jacket 18 (shown in FIG. 9) is formed about the sheath as a final layer of insulation for the cable 19. The plastic jacket may be made of polyethylene. The cable 19 is then advanced through a conventional water trough 35. In the water trough, the jacket 18 is cooled to a temperature to prevent deformation thereof by subsequent manufacturing operations. The cable 19 is then advanced through a tractor capstan 36. As is known in the art, the tractor capstan 36 may consist of opposed bands of driven caterpillar treads which serve to advance the cable 19 through the manufacturing line as well as advance the cable core 10 and metal tape 12 from their payoff stands, 21 and 22, respectively.

Finally, the cable 19 passes through a footage counter and marker 37, also well known in the art, and is taken up on a conventional driven takeup reel 38 in a reel stand 39.

The edge former 50 referred to previously in the description of FIG. 1 is shown in more detail in FIGS. 4 to 8, inclusive.

Figure 4:
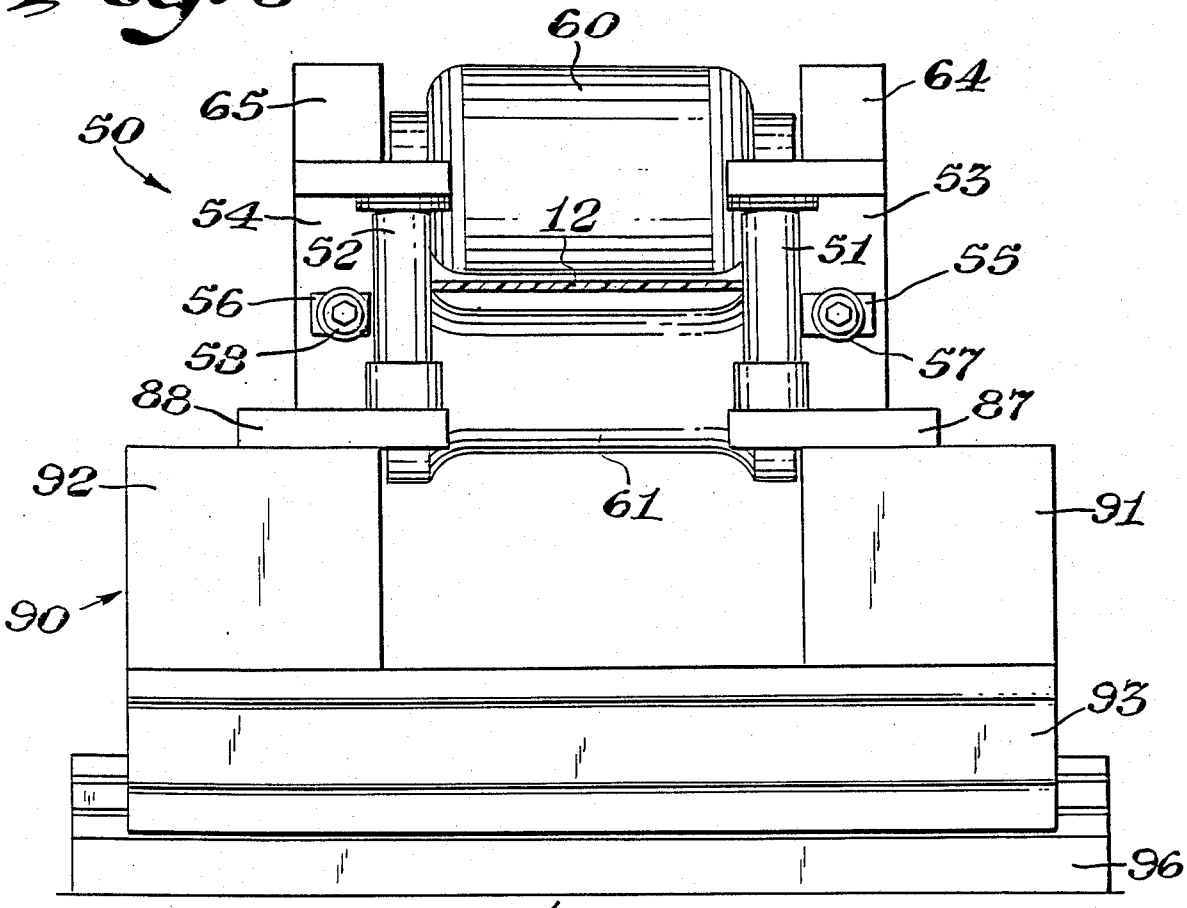
FIG. 4 is an elevational view of an edge former with the rollers in unengaged position.

FIG. 4 shows an elevational view of the edge former 50. The generally planar metal tape 12 enters on the upstream side of the edge former between a first guide roll 51 and a second guide roll 52 positioned on either edge of the metal tape 12.

Figure 7:
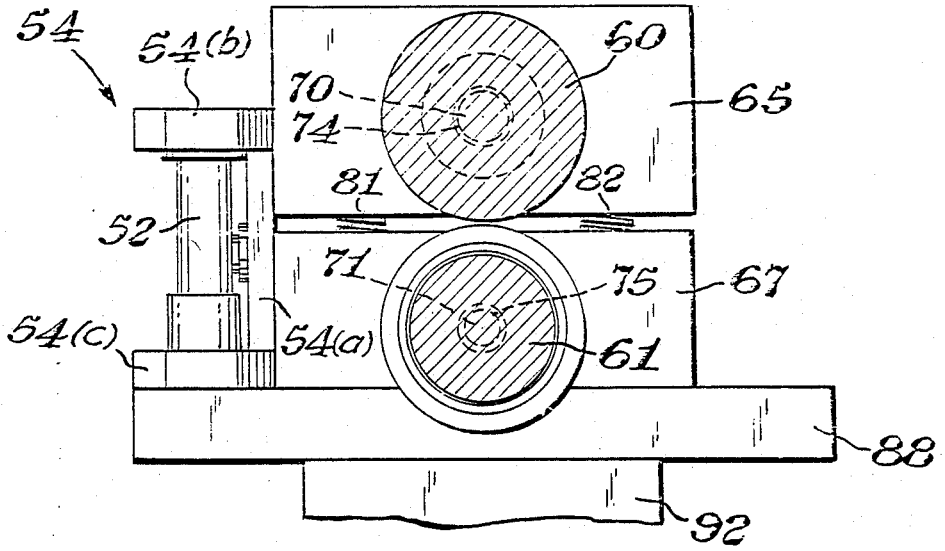
FIG. 7 shows a fragmentary cross-sectional view of the present invention and is taken substantially on the line 7—7 of FIG. 6.
Figure 8:
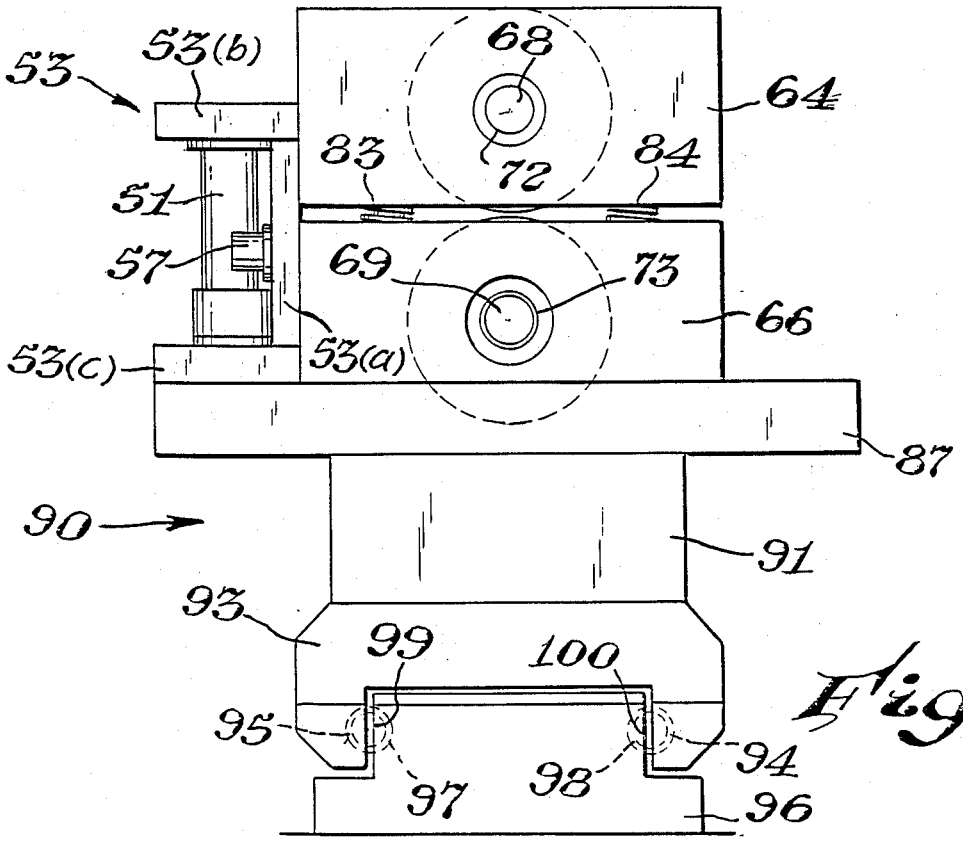
FIG. 8 is an end view of the edge former mounted on a self-tracking base.

The two guide rollers 51 and 52 may be mounted so that the metal tape enters the edge former within desired tolerances. Should the tape begin to move laterally, it would tangentially contact one of the guide rollers. Each guide roller is attached to at least one guide roll mount. Each mount is advantageously designed to selectively align each guide roll relative to the tape path, depending on the width of the tape. For example, preferred guide roll mounts 53 and 54 are shown in FIGS. 4 through 8. Each said guide roll mount has a generally C-shaped configuration with the open-ended side facing upstream. Guide roller mounts 53 and 54 have central portions 53(*a*) and 54(*a*), respectively; and peripheral portions 53(*b*) and 53(*c*), and 54(*b*)

and 54(*c*), respectively. At least one guide roller is spaced between and rotatably attached to the peripheral sides of each guide support. For example, as seen in FIGS. 7 and 8, guide roller 51 is rotatably attached on either end to peripheral guide roller portions 53(*b*) and 53(*c*), and guide roller 52 is rotatably attached on either end to peripheral guide roller portions 54(*b*) and 54(*c*). Thus the major axis of each guide roller is generally normal to the tape path.

Figure 6:
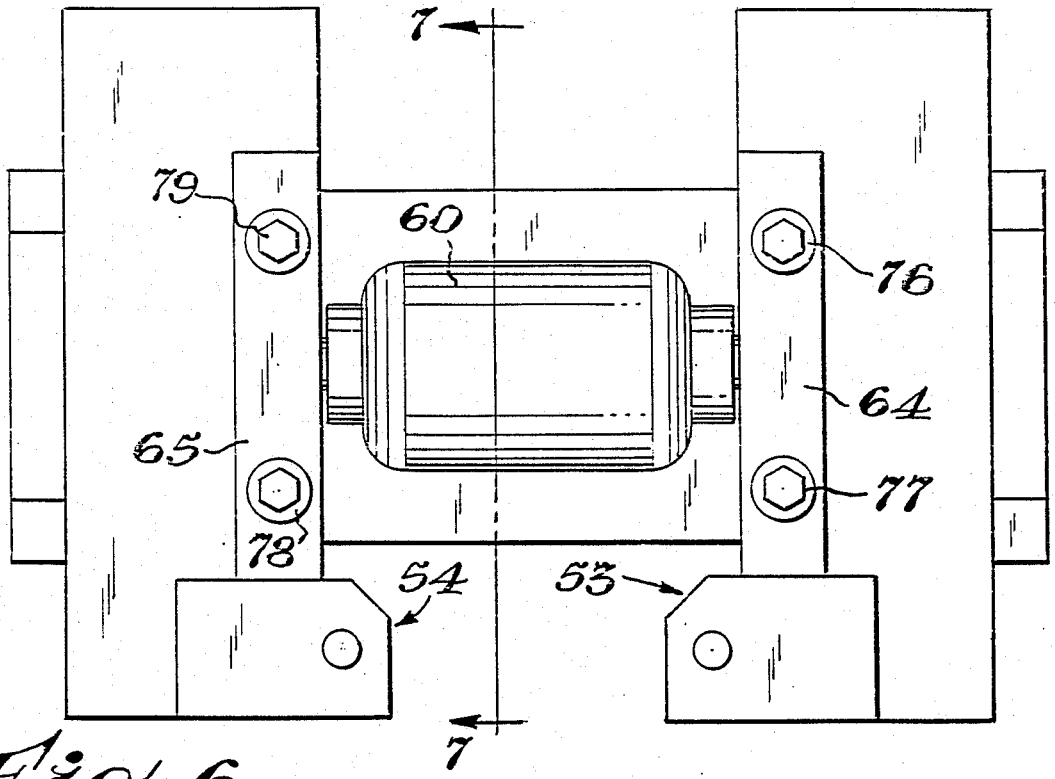
FIG. 6 shows in plan view the top portion of the edge former.

Guide roller mount central portions 53(*a*) and 54(*a*) may each define an elongated opening through which a bolt is bolted to the edge former. The elongated bolt opening has its major diameter so that prior to tightening the bolt the guide rollers may be selectively positioned along a plane generally transverse to the tape path. Each mount (as seen in FIG. 6) may have a beveled edge on its downstream side adjacent the tape path so as not to impede tape advancement.

From the guide rollers, the metal tape passes between edge bending means. The edge bending means bends the longitudinal edge portions of the generally planar metal tape about, i.e., along a line defined by longitudinally extending bend positions of the material. Suitable means for edge bending comprises a set of forming rollers. Preferred rollers include a first movable roller 60 and a second fixed roller 61, which are positioned along either face of the metal tape. Each roller is rotatably attached to at least one, preferably two, roller mounts.

Advantageously, one of the rollers has a surface defining flanged ends, and the other roller has a surface that facially conforms to the curvatures of the flanged roller. The rollers are mounted so that the edge former may be selectively positioned between an "engaged" and an "unengaged" position. By "engaged" and "unengaged" are meant that the movable roller may be positioned into or out of deformable contact, respectively, with the metallic tape 12.

As the tape passes through the edge former in an unengaged position, it will generally be at least partially supported by the fixed roller.

Figure 5:
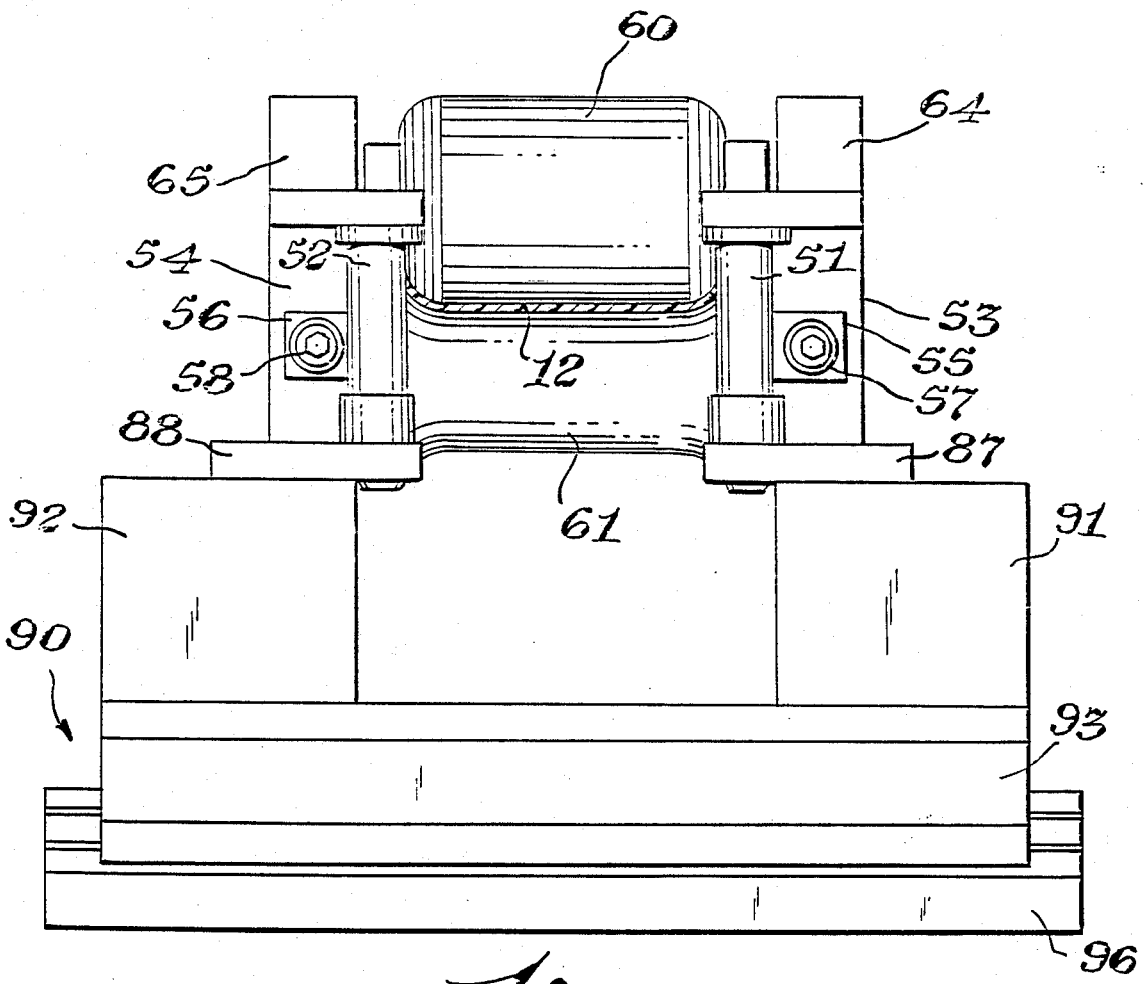
FIG. 5 is an elevational view of an edge former with the rollers in engaged position.

FIG. 5 shows that the metal tape 12 is deformed by positioning the edge former in the engaged position, whereby the movable roller 60 applies pressure across the tape path to that tape face which is not supported by the fixed roller 61.

Each longitudinal edge portion of the tape is bent, preferably in a smooth curved configuration, towards the tape face that will be in faying relationship with the cable core. The edge portions are bent at a curvature sufficient to preclude the outer edge portion of the shield from protruding into the polyethylene jacket. Advantageously, the two longitudinal edge portions will have complementary curvatures to provide a structure which forms a substantially closed seam. Generally, the bent edge portions will each have an angle relative to adjacent lateral portions of tape of between about 1° and about 90°, preferably, between about 15° and about 60°.

Reference will be made to FIGS. 6 through 8 to describe in detail exemplary means to mount the forming rollers 60 and 61. Movable roller 60 is rotatably mounted at each end to forming roller mounts 64 and 65, and fixed roller 61 is rotatably mounted at each end to forming roller mounts 66 and 67. Rollers 60 and 61 each have two shaft extremities which are rotatably journaled in ball bearings 68 and 69, 70 and 71, respectively. The ball bearings 68, 69, 70, and 71 are pressed into bushings 72, 73, 74 and 75, respectively; and the bushings in their turn are fixedly clamped in the parts of the roller mounts.

The movable roller mounts 64 and 65 are resiliently supported on fixed roller mounts 66 and 67, respectively, by a plurality of spring members. Spring members 83 and 84 are disposed between adjacent recesses in movable mount 64 and fixed mount 66. Spring members 81 and 82 are disposed between adjacent recesses in movable mount 65 and fixed mount 67.

Adjusting means is provided to adjust the position of the movable roller. The adjusting means comprises at least one manually operable bolt-threaded means in the form of a bolt. A bolt or screw is passed through a bore in each movable roller mount, through each spring and is threadably received through the adjacent recess in each fixed roller mount. Bolts 76 and 77 are passed through bores in movable roller mount 64, through spring members 83 and 84, respectively, and are each threadably received in fixed roller mount 66. Bolts 78 and 79 are passed through bores in movable roller mount 65, through spring members 81 and 82, respectively, and are each threadably received in fixed roller mount 67. The resilient mounting of the movable roller mounts permits adjustment of the position of the movable roller relative to the fixed roller by tightening or loosening bolts 76, 77, 78 and 79.

The edge forming means is of such a design that rollers having different "effective" lengths may be mounted. By "effective" length is meant that, depending on the width of the tape, the desired bending of the tape edges may be accomplished.

Fixed roller mounts 66 and 67 are fixedly attached to generally planar supports 87 and 88, respectively. Optionally, spacers 91 and 92 are fixedly attached to planar supports 87 and 88, respectively. Spacers 91 and 92 permit the height of the edge former to be adjusted relative to the height of downstream apparatus, thereby increasing the speed at which the tape is moved through the manufacturing line.

The edge forming means may be attached to a suitable base. FIGS. 4, 5, and 8 show a base 90 adapted to track the lateral movement of the tape as it is pulled along the tape path. The base 90 comprises a first tracking member 93, and a second tracking member 96. Spacers 91 and 92 are fixedly attached to fixed roller mounts 66 and 67, respectively, remotely from forming rollers 60 and 61, and fixed to supports 87 and 88, respectively. First tracking member 93 is fixedly attached to spacers 91 and 92 at a location remote from fixed roller mounts 66 and 67. The first tracking member 93 defines a groove having outer ball bearing runs 94 and 95 which are in generally linear alignment with inner ball bearing runs 97 and 98 defined in the second tracking member 96. The second tracking member 96 is partially disposed within the groove of and slidably mounted to the first tracking member at a location remote from the fixed roller mounts 66 and 67. Ball bearings 99 and 100 are disposed within the grooves defined by the inner and outer ball bearing runs.

Figure 9:
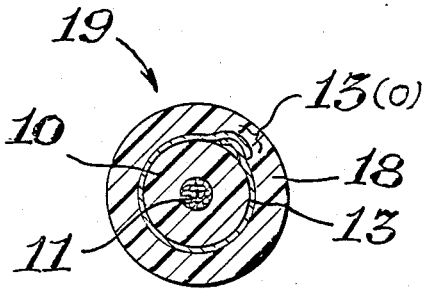
FIG. 9 is a cross-section of a typical conductor power cable having a metal sheath, and exterior plastic jacket.

In FIG. 9, a cable 19, comprising insulated low resistance metallic conductor(s) or optical fibers(s) and a metal sheath 13, is shown. The core 10, which is formed of one or more cable units 11, may be an insulated or stranded conductor, usually of copper, aluminum, or steel. The core may comprise insulated wires in a twisted or bundled configuration, or optical fibers in a tube, bundle, tape, or loose configuration. Sheath 13 is clad about the core and has overlapped ends 13(*o*). The sheath is a longitudinally folded tape of any ductile metal. An outer jacket 18 of plastic material such as polyethylene is extruded around the outside of the sheath. The heat from the extrusion process causes the plastic on the outer surface of the sheath 13 to fuse to the plastic of the jacket, and also causes any plastic on the overlapped ends 13(*o*) to bond together. The outer jacket 18 is advantageously bonded to sheath 13 at their surface of contact by means of at least a thin coextensive layer of adhesive copolymer of ethylene and unsaturated carboxylic acid. The thin coextensive layer of adhesive copolymer can extend to completely cover both sides of the sheath 13, and of, course, can be comprised throughout the composition of the plastic jacket 18.

I claim:

1. An apparatus for forming a sheath of metal tape about a cable core, the core and metal tape to be covered with a plastic jacket, the apparatus comprising:

means for longitudinally advancing the cable core along a feed path and for coordinately advancing the metal tape with the cable core, said metal tape being generally planar and defining a first and second face each having longitudinal edge portions with centrally located lateral adjacent tape portions;

means for bending the longitudinal edge portions comprising (1) an edge forming means which comprises (a) a support having a surface for supporting the first face of the metal tape and (b) pressure applying means to apply pressure to the second face of the metal tape to deform the longitudinal edge portions of the tape to a generally smooth curved configuration relative to the lateral adjacent tape portions and towards the lateral adjacent tape portion that will be in faying relationship with the cable core, said edge portions being curved sufficiently to preclude the outer edge portions of the sheath from protruding into the plastic jacket and (2) a base mounted to the edge forming means, said base comprising means to movably adjust the edge forming means in relation to lateral movement of the metal tape as it is pulled along the tape path; and means for engaging and forming the metal tape into a tubular sheath with the bent edge portions overlapped.

2. The apparatus of claim 1 wherein the edge bending means further comprises a fixed forming roller which supports a portion of the metal tape as it is pulled along the feed path and a movable forming roller. one of said forming rollers having flanged ends and the other forming roller having a surface that facially conforms to the curvatures of the flanged roller; and adjustment means to move the movable forming roller between engaged and unengaged positions.

3. The apparatus of claim 2 wherein the edge bending means further comprises:

at least one fixed forming roller mount defining at least one recess and at least one movable forming roller mount defining an adjacent recess for each recess in the fixed forming roller mount, said movable forming roller mount having the movable forming roller rotatably attached thereto and the fixed forming roller mount having the fixed forming roller rotatably attached thereto;

a plurality of spring members resiliently supporting the moveable roller mount on the fixed roller mount, one of said spring members being disposed between the adjacent recesses in the fixed and forming rollers;

a plurality of bolts, a different bolt passing through each recess in the movable forming roller through the spring coaxially disposed with said recess and threadably engaging the adjacent recess in the fixed forming roller;

whereby tightening or loosening the bolts adjusts the movable forming roller relative to the fixed forming roller.

4. The apparatus of claim 1 wherein the edge bending means is adapted to bend each longitudinal edge portion of the metal tape to an angle relative to adjacent portions of tape of between about 1° and about 90°.

5. The apparatus of claim 1 wherein the edge bending means is adapted to bend each longitudinal edge portion of the metal tape to an angle relative to adjacent portions of tape of between about 15° and about 60°.

6. The apparatus of claim 1 wherein the edge bending means further comprises on its upstream side edge guiding means to contact the longitudinal edges of the metal tape and to adjust the position of the tape and align it prior to deformation in the edge bending means.

7. An apparatus for bending the longitudinal edge portions of a metal tape, said apparatus which comprises an edge forming means and a base mounted to the edge forming means, said edge forming means comprising a support surface for a portion of one side of the metal tape and pressure applying means to apply pressure to the other side of the metal tape to deform longitudinal edge portions of the tape to a generally curved configuration about longitudinally extending bend positions, said base comprising means to movably adjust the edge forming means in relation to lateral movement of the metal tape as it is pulled along the tape path.

8. The apparatus of claim 7, wherein the edge bending means comprises first and second forming rollers, one of said forming rollers having a surface with flanged ends and the other forming roller having a surface that facially conforms to the curvatures of the flanged roller, and adjusting means to move said first roller relative to said second roller.

9. The apparatus of claim 7, wherein the adjusting means comprises at least one fixed forming roller mount defining at least one recess and at least one movable forming roller mount defining an adjacent recess for each recess in the fixed forming roller mount, said movable forming roller mount having the movable forming roller rotatably attached thereto and the fixed forming roller mount having the fixed forming roller rotatably attached thereto;

a plurality of spring members resiliently supporting the movable roller mount on the fixed roller mount, one of said spring members being disposed between the adjacent recesses in the fixed and forming rollers;

a plurality of bolts, a different bolt passing through each recess in the movable forming roller through the spring coaxially disposed with said recess and threadably engaging the adjacent recess in the fixed forming roller;

whereby tightening or loosening the bolts adjusts the movable forming roller relative to the fixed forming roller.

10. The apparatus of claim 7 further comprising on its upstream side edge guiding means to contact the longitudinal edge portions of the metal tape and to adjust the position of the tape and align it prior to deformation by the edge bending means.

* * * * *